US011636663B2

(12) United States Patent
Barkan et al.

(10) Patent No.: US 11,636,663 B2
(45) Date of Patent: Apr. 25, 2023

(54) LOCALIZING RELEVANT OBJECTS IN MULTI-OBJECT IMAGES

(71) Applicant: Microsoft Technology Licensing, LLC, Redmond, WA (US)

(72) Inventors: Oren Barkan, Tel Aviv (IL); Amir Hertz, Tel Aviv (IL); Omri Armstrong, Tel Aviv (IL); Noam Koenigstein, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 17/180,576

(22) Filed: Feb. 19, 2021

(65) Prior Publication Data

US 2022/0269895 A1 Aug. 25, 2022

(51) Int. Cl.
*G06V 10/25* (2022.01)
*G06T 7/11* (2017.01)
*G06V 20/64* (2022.01)
*G06K 9/62* (2022.01)

(52) U.S. Cl.
CPC .......... *G06V 10/25* (2022.01); *G06K 9/623* (2013.01); *G06K 9/627* (2013.01); *G06T 7/11* (2017.01); *G06V 20/64* (2022.01); *G06T 2207/20132* (2013.01)

(58) Field of Classification Search
CPC ........ G06K 9/627; G06K 9/623; G06V 20/64; G06T 7/11
See application file for complete search history.

(56) References Cited

U.S. PATENT DOCUMENTS

| 10,083,352 | B1 * | 9/2018 | Solh | G06V 40/10 |
| 10,380,853 | B1 * | 8/2019 | Solh | G06V 10/763 |
| 10,846,327 | B2 * | 11/2020 | Salokhe | G06N 20/00 |
| 10,902,264 | B2 * | 1/2021 | Marder | G06N 20/00 |
| 11,176,403 | B1 * | 11/2021 | Singh | G06V 20/647 |

(Continued)

OTHER PUBLICATIONS

"International Search Report & Written Opinion issued in PCT Application No. PCT/US22/013815", dated Apr. 11, 2022, 10 Pages.

(Continued)

*Primary Examiner* — Mia M Thomas
(74) *Attorney, Agent, or Firm* — Barta, Jones & Foley, PLLC

(57) ABSTRACT

Solutions for localizing relevant objects in multi-object images include receiving a multi-object image; detecting a plurality of detected objects within the multi-object image; generating a primary heatmap for the multi-object image, the primary heatmap having at least one region of interest; determining a relevant detected object corresponding to a region of interest in the primary heatmap; determining an irrelevant detected object not corresponding to a region of interest in the primary heatmap; and indicating the relevant detected object as an output result but not indicating the irrelevant detected object as an output result. Some examples identify a plurality of objects that are visually similar to the relevant object and displaying the visually similar objects to a user, for example as recommendations of alternative catalog items on an e-commerce website. Some examples are able to identify a plurality of relevant objects and display multiple sets of visually similar objects.

20 Claims, 12 Drawing Sheets

(56) References Cited

U.S. PATENT DOCUMENTS

| | | | | |
|---|---|---|---|---|
| 2012/0310864 | A1* | 12/2012 | Chakraborty | G06K 9/6262 706/12 |
| 2014/0302476 | A1* | 10/2014 | Sorensen | G09B 7/00 434/307 R |
| 2016/0078361 | A1* | 3/2016 | Brueckner | H04L 67/10 706/12 |
| 2018/0137119 | A1 | 5/2018 | Li et al. | |
| 2018/0260664 | A1 | 9/2018 | Krishnamurthy et al. | |
| 2019/0108411 | A1* | 4/2019 | Liu | G06V 10/82 |
| 2019/0213406 | A1* | 7/2019 | Porikli | G06T 7/11 |
| 2020/0327360 | A1* | 10/2020 | Samala | G06V 10/82 |
| 2021/0279866 | A1* | 9/2021 | Svekolkin | G06V 10/454 |
| 2022/0051020 | A1* | 2/2022 | Jha | G06K 9/6253 |
| 2022/0147743 | A1* | 5/2022 | Roy | G06K 9/6215 |
| 2022/0147751 | A1* | 5/2022 | Vitek | G06V 20/58 |
| 2022/0185625 | A1* | 6/2022 | One | G06V 10/454 |
| 2022/0292543 | A1* | 9/2022 | Henderson | G06Q 30/0269 |

OTHER PUBLICATIONS

Adebayo, et al., "Sanity checks for saliency maps", In Proceedings of 32nd Conference on Neural Information Processing Systems, Dec. 3, 2018, pp. 1-11.

Ben-Baruch, et al., "Asymmetric loss for multi-label classification", In Repository of arxiv:2009.14119v2, Nov. 17, 2020, pp. 1-12.

Chattopadhay, et al., "Grad-cam++: Generalized gradient-based visual explanations for deep convolutional networks", In IEEE Winter Conference on Applications of Computer Vision, Mar. 12, 2018, pp. 839-847.

Chen, et al., "Adapting Grad-CAM for Embedding Networks", In Proceedings of IEEE Winter Conference on Applications of Computer Vision, Mar. 1, 2020, pp. 2794-2803.

Deng, et al., "Imagenet: A Large-scale Hierarchical Image Database", In IEEE Conference on Computer Vision and Pattern Recognition, Jun. 20, 2009, 8 Pages.

Doshi-Velez, et al., "Accountability of AI under the law: The role of explanation", In Repository of Computing Research Repository, Nov. 3, 2017, pp. 1-14.

Everingham, et al., "The pascal visual object classes (voe) challenge", In International Journal of Computer Vision, vol. 88, Issue 2, Jun. 2020, pp. 1-34.

He, et al., "Deep Residual Learning for Image Recognition", In Proceedings of the IEEE Conference on Computer Vision and Pattern Recognition, Jun. 27, 2016, pp. 770-778.

Hoffer, et al., "Deep Metric Learning Using Triplet Network", In Proceedings of International Workshop on Similarity-Based Pattern Recognition, Oct. 12, 2015, 8 Pages.

Huang, et al., "Densely connected convolutional networks", In Proceedings of the IEEE conference on computer vision and pattern recognition, Jul. 21, 2017, pp. 4700-4708.

Lecun, et al., "Gradient-based learning applied to document recognition", In Proceedings of the IEEE, vol. 86, Issue 11, Nov. 1998, pp. 1-46.

Lin, et al., "Microsoft COCO: Common Objects in Context", In Proceedings of European conference on computer vision, Sep. 2014, pp. 1-15.

Mahendran, et al., "Visualizing deep convolutional neural networks using natural pre-images", In International Journal of Computer Vision, vol. 120, Issue 3, Apr. 15, 2016, pp. 1-25.

Radenovic, et al., "CNN image retrieval learns from BoW: Unsupervised fine-tuning with hard examples", In Proceedings of European Conference on Computer Vision, Oct. 8, 2016, pp. 1-17.

Rajpurkar, et al., "CheXNet: Radiologist-Level Pneumonia Detection on Chest X-Rays with Deep Learning", In Repository of arXiv:1711.05225, Nov. 14, 2017, 7 Pages.

Schroff, et al., "FaceNet: A Unified Embedding for Face Recognition and Clustering", In Proceedings of IEEE Conference on Computer Vision and Pattern Recognition, Jun. 7, 2015, pp. 815-823.

Selvaraju, et al., "Grad-CAM: Visual explanations from deep networks via gradient-based localization", In Proceedings of the IEEE international conference on computer vision, Oct. 22, 2017, pp. 618-626.

Simonyan, et al., "Deep inside convolutional networks: Visualising image classification models and saliency maps", In Repository of arXiv preprint arXiv:1312.6034, Dec. 20, 2013, pp. 1-8.

Song, et al., "Deep Metric Learning via Lifted Structured Feature Embedding", In Proceedings of the IEEE Conference on Computer Vision and Pattern Recognition, Jun. 27, 2016, pp. 4004-4012.

Springenberg, et al., "Striving for simplicity: The all convolutional net", In Repository of arXiv preprint arXiv:1412.6806, Dec. 21, 2014, pp. 1-14.

Stylianou, et al., "Visualizing deep similarity networks", In Proceedings of IEEE winter conference on applications of computer vision (WACV), Jan. 7, 2019, 9 Pages.

Sun, et al., "Deep learning face representation by joint identification verification", In Advances in neural information processing systems, Dec. 2014, pp. 1-9.

Tolias, et al., "Particular object retrieval with integral max-pooling of CNN activations", In Repository of arXiv preprint arXiv:1511.05879, Nov. 18, 2015, pp. 1-12.

Vellido, et al., "Making machine learning models interpretable", In Proceedings of 20th European Symposium on Artificial Neural Networks, Apr. 25, 2012, pp. 163-172.

Wang, et al., "Chestxray8: Hospital-scale chest x-ray database and benchmarks on weakly-supervised classification and localization of common thorax diseases", In Proceedings of the IEEE conference on computer vision and pattern recognition, 2017, pp. 2097-2106.

Wang, et al., "Learning fine-grained image similarity with deep ranking", In Proceedings of the IEEE Conference on Computer Vision and Pattern Recognition, Jun. 23, 2014, pp. 1386-1393.

Yi, et al., "Deep Metric Learning for Person Re-Identification", In Proceedings of 22nd International Conference on Pattern Recognition, Aug. 24, 2014, 6 Pages.

Yosinski, et al., "Understanding neural networks through deep visualization", In Repository of arXiv:1506.06579v1, Jun. 22, 2015, pp. 1-12.

Yu, et al., "Visualizing and comparing convolutional neural networks", In Repository of arXiv:1412.6631v2, Dec. 26, 2014, pp. 1-10.

Zeiler, et al., "Visualizing and understanding convolutional networks", In Proceedings of European Conference on Computer Vision, Sep. 6, 2014, pp. 818-833.

Zeiler,, et al., "Adaptive Deconvolutional Networks for Mid and High Level Feature Learning", In Proceedings of the International Conference on Computer Vision, Nov. 2011, pp. 2018-2025.

* cited by examiner

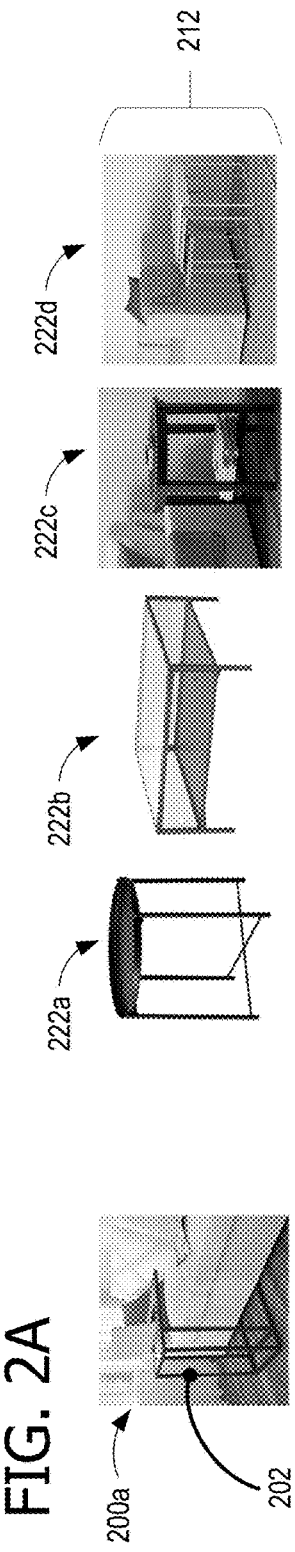
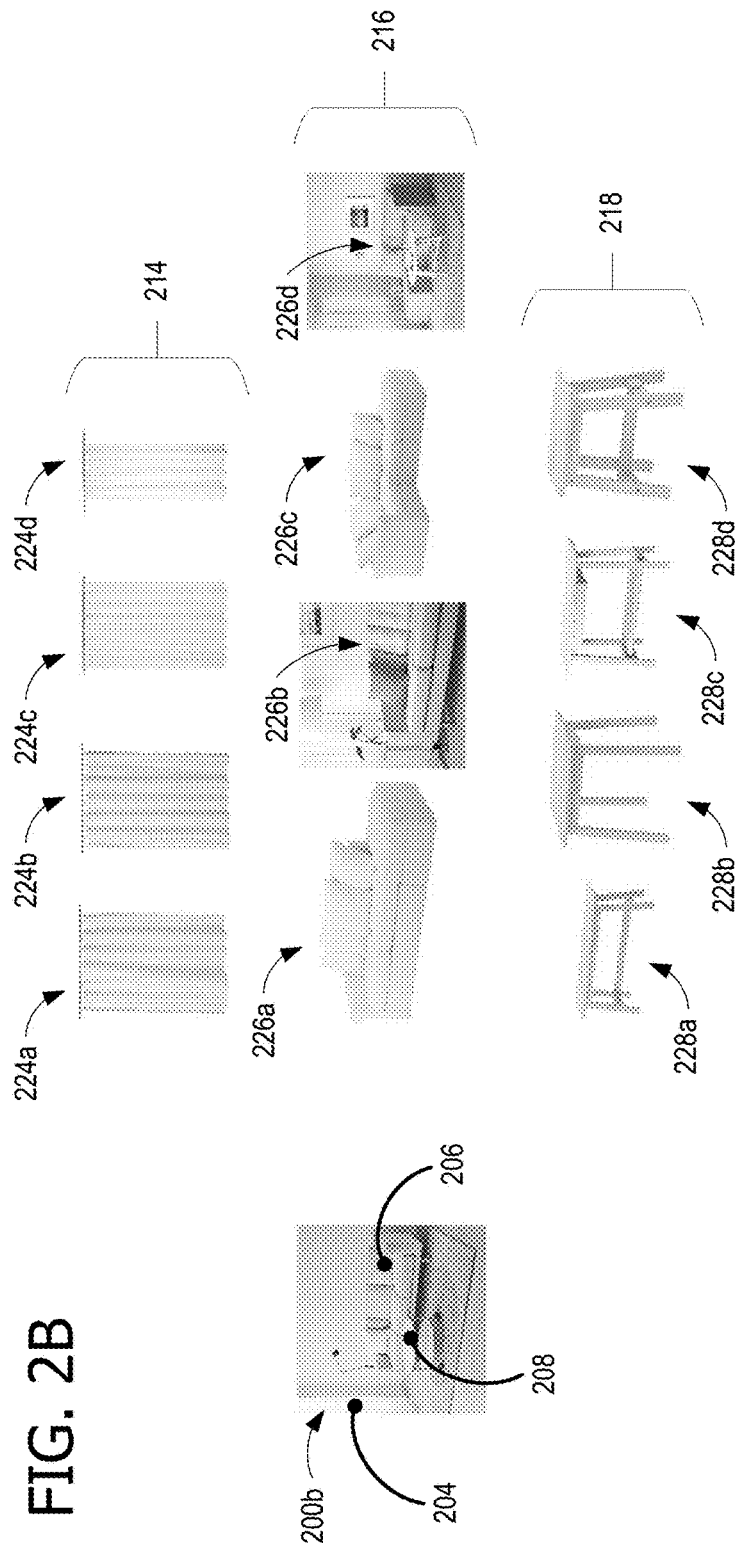
FIG. 2A
FIG. 2B

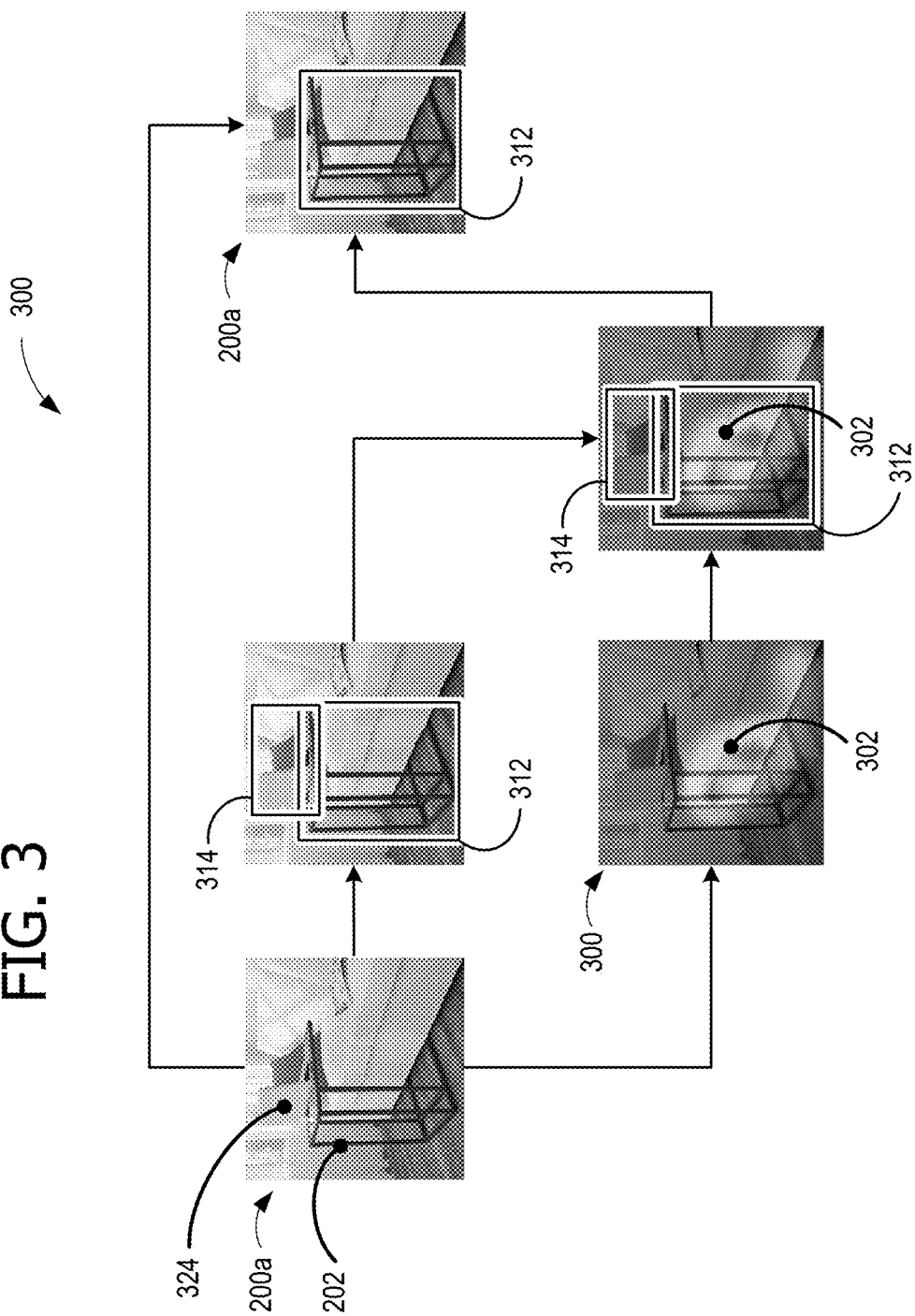

LOCALIZING RELEVANT OBJECTS IN MULTI-OBJECT IMAGES

BACKGROUND

Localizing relevant objects in images that show multiple items (multi-object images), such as catalog images that may have multiple types of household furnishings, and even humans, is a significant challenge in computer vision (CV) tasks. This is because some or many objects within multi-object images are not relevant to a particular CV task. Current methods that solve localization tasks are data driven and based on machine learning (ML) models that are trained on supervised, labeled data. However, the process of labeling such localization data is often labor-intensive, rendering it expensive. Consequently, it is often not practical to train a detection model for each group of items for which localization is needed.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for localizing relevant objects in multi-object images include receiving a multi-object image; detecting a plurality of detected objects within the multi-object image; generating a primary heatmap for the multi-object image, the primary heatmap having at least one region of interest; determining a relevant detected object corresponding to a region of interest in the primary heatmap; determining an irrelevant detected object not corresponding to a region of interest in the primary heatmap; and indicating the relevant detected object as an output result but not indicating the irrelevant detected object as an output result. Some examples identify a plurality of objects that are visually similar to the relevant object and displaying the visually similar objects to a user, for example as recommendations of alternative catalog items on an e-commerce website. Some examples are able to identify a plurality of relevant objects and display multiple sets of visually similar objects.

BRIEF DESCRIPTION OF THE DRAWINGS

The disclosed examples are described in detail below with reference to the accompanying drawing figures listed below:

FIGS. 2A and 2B show practical applications for localizing relevant objects in multi-object images that are enabled by the disclosure and may be output by the arrangement of FIG. 1;

FIG. 3 illustrates the suppression of an irrelevant object from the output results using the arrangement of FIG. 1;

Corresponding reference characters indicate corresponding parts throughout the drawings.

DETAILED DESCRIPTION

Figure 1:
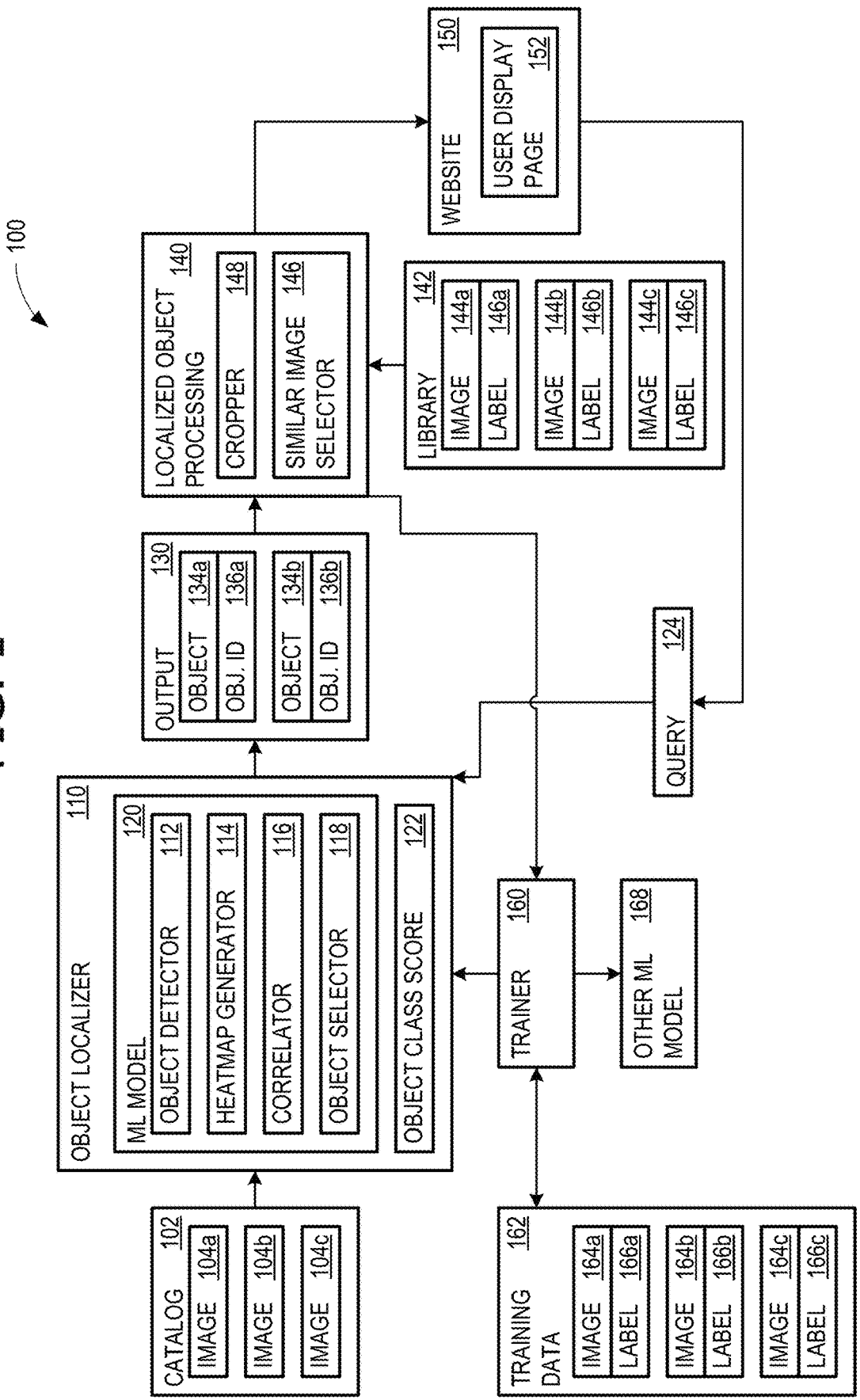
FIG. 1 illustrates an arrangement 100 for localizing relevant objects in multi-object images.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for localizing relevant objects in multi-object images include receiving a multi-object image; detecting a plurality of detected objects within the multi-object image; generating a primary heatmap for the multi-object image, the primary heatmap having at least one region of interest; determining a relevant detected object corresponding to a region of interest in the primary heatmap; determining an irrelevant detected object not corresponding to a region of interest in the primary heatmap; and indicating the relevant detected object as an output result but not indicating the irrelevant detected object as an output result. Some examples identify a plurality of objects that are visually similar to the relevant object and displaying the visually similar objects to a user, for example as recommendations of alternative catalog items on an e-commerce website. Some examples are able to identify a plurality of relevant objects and display multiple sets of visually similar objects.

Aspects of the disclosure operate in an unconventional manner by both performing object detection and generating a heatmap, and determining relevant and irrelevant detected objects according to correspondence between detected objects and a region of interest in the heatmap. Aspects of the invention provide practical results by indicating the relevant detected object as an output result but not indicating the irrelevant detected object as an output result. Aspects of the invention provide further practical results by displaying a plurality of visually similar objects (similar to the relevant detected object) to a user, for example on an e-commerce website when the multi-object image comprises a query image.

This permits the intelligent selection of alternative product suggestions when a user is observing a catalog image that contains multiple items (objects). Some catalog images may contain, for example, a plurality of common household objects (e.g., a couch, a chair, a table, a houseplant, an area rug, dishes, draperies, and even human models), when the particular product (or products) being advertised is just a single one (or only a few) of the objects. This may be common when the initial advertiser wishes to display the object for sale in an appealing household context setting. At a later time, an e-commerce website may have access to the catalog images, without being able to control the content, in order to eliminate the superfluous "context" objects. These superfluous objects are irrelevant to the specific item being advertised.

A visitor to an e-commerce website may wish to consider alternative products, and machine learning (ML or artificial intelligence (AI), collectively ML) models may perform object selection based on visual similarity (to the product being viewed), in order to make an automated selection of the alternative products to display to the website visitor. However, the presence of the irrelevant objects in the catalog image may confuse common ML models, risking a scenario in which a user is considering purchasing a piece of furniture, but is instead presented with notebook computers or draperies as alternative product suggestions.

Inputs are images from a catalog, labeled according to the primary product being advertised using each image, and a queried product type. A set of bounding boxes, specifying different regions of an image, is generated for a specified catalog image (e.g., a query image), using an object detection model. Each bounding box contains an object, but may not be the object corresponding to the queried product type (e.g., specified according to a class label). One or more heatmaps is also generated for the specified catalog image, using a pre-trained classification model. The heatmaps have a region of interest, which is a flare region in which pixels have relatively high values.

In some examples, the heatmaps for a given image are generated using a gradient activation map (GAM) process: the image is passed through the classification model to obtain the activation maps of the final N layers of the classification model their corresponding gradients with respect to the top predications scores. The gradients are used to highlight the important areas in each activation map that contribute to the prediction score. To draw the heatmap, the maps of the last layers are combined and upsampled to the size of the input catalog image. The intersection score for each bounding box is calculated to determine relevance. In some examples, an intersection score is calculated using union of the bounding box and the heatmap pixels within the bounding box having sufficiently high values (e.g., the pixel values exceed a threshold value).

FIG. 1 illustrates an arrangement 100 for localizing relevant objects in multi-object images. In some examples, the multi-object image comprises a query image, such as a catalog image being viewed by an e-commerce website visitor, from which alternative product suggestions that are visually similar to a specified object are to be identified. Arrangement 100 includes an object localizer 110, that determines which objects in a multi-object image are relevant to a query 124, and which are irrelevant, and a localized object processing 140 that intakes an output result 130 (from object localizer 110) to use for a further practical result, such as providing imagery to a website 150 for display to a website visitor (e.g., a user) on a user display page 152. The multi-object images may be drawn from a catalog 102 that has a multi-object image 104a, a multi-object image 104b, and a multi-object image 104c. In some examples, catalog 102 may cover thousands of products, each with one or more images, and each image having up to a dozen or more irrelevant objects (e.g., items used to provide context to the product advertised for sale). Query 124 identifies an object class for which to search in a multi-object image. In some examples, query 124 is defined by activity of a visitor in website 150 (e.g., which products the website visitor or user is examining).

Object localizer 110 comprises an ML model 120 which includes a general object detector 112 and a heatmap generator 114 (e.g., a pre-trained classification model). In some examples, heatmap generator 114 uses a GAM process to generate a heatmap for a particular object type, as identified according to an object class identification (object ID). The heatmap identifies the most relevant region (e.g., a region of interest, such as a flare region of high pixel values) in an image that contributes to the image having a particular object ID label. In some examples, object detector 112 and heatmap generator 114 use different networks that are independently trained. In some examples, heatmap generator 114 comprises a deep learning model with a convolutional neural network (CNN). In some examples, the CNN of heatmap generator 114 comprises 50 layers or more, and may be a residual CNN. In some examples, heatmap generator 114 produces an object class score 122 (e.g., an intersection score) that identifies a similarity between two images, such as a portion of a larger image that has been cropped to a region containing an object of interest. In similarity tasks, two images X and Y may be mapped to vectors and assigned a similarity score $S(F_X, F_Y)$. In some examples, a cosine similarity or dot product, or an inner product (or other function) is used for S. In some examples, the representation produced by F is extracted from a hidden layer of heatmap generator 114. In some examples, object class score 122 for each of multiple detected objects are ranked, with the highest score or scores identified as being relevant to a query.

The GAM process combines one or more activation maps of a network with one or more corresponding gradient maps of the network to produce one or more saliency maps. An activation map identifies neurons n a network that are activated and a gradient map indicates the contribution of a pixel to an output score (e.g., a similarity score). Saliency maps are combined (when more than a single one is generated) to produce the output heatmap.

In some examples, heatmap generator 114 generates a region of interest for a single relevant object at a time, and generating multiple regions of interest for multiple relevant objects requires multiple iterations (for each object ID) and combination of the individual regions of interest (e.g., by superposition) into a composite heatmap. In some examples, heatmap generator 114 is trained to generate multiple regions of interest for multiple relevant objects in a single operation. Thus, various operational modes are available for heatmap generator 114.

Figure 4:
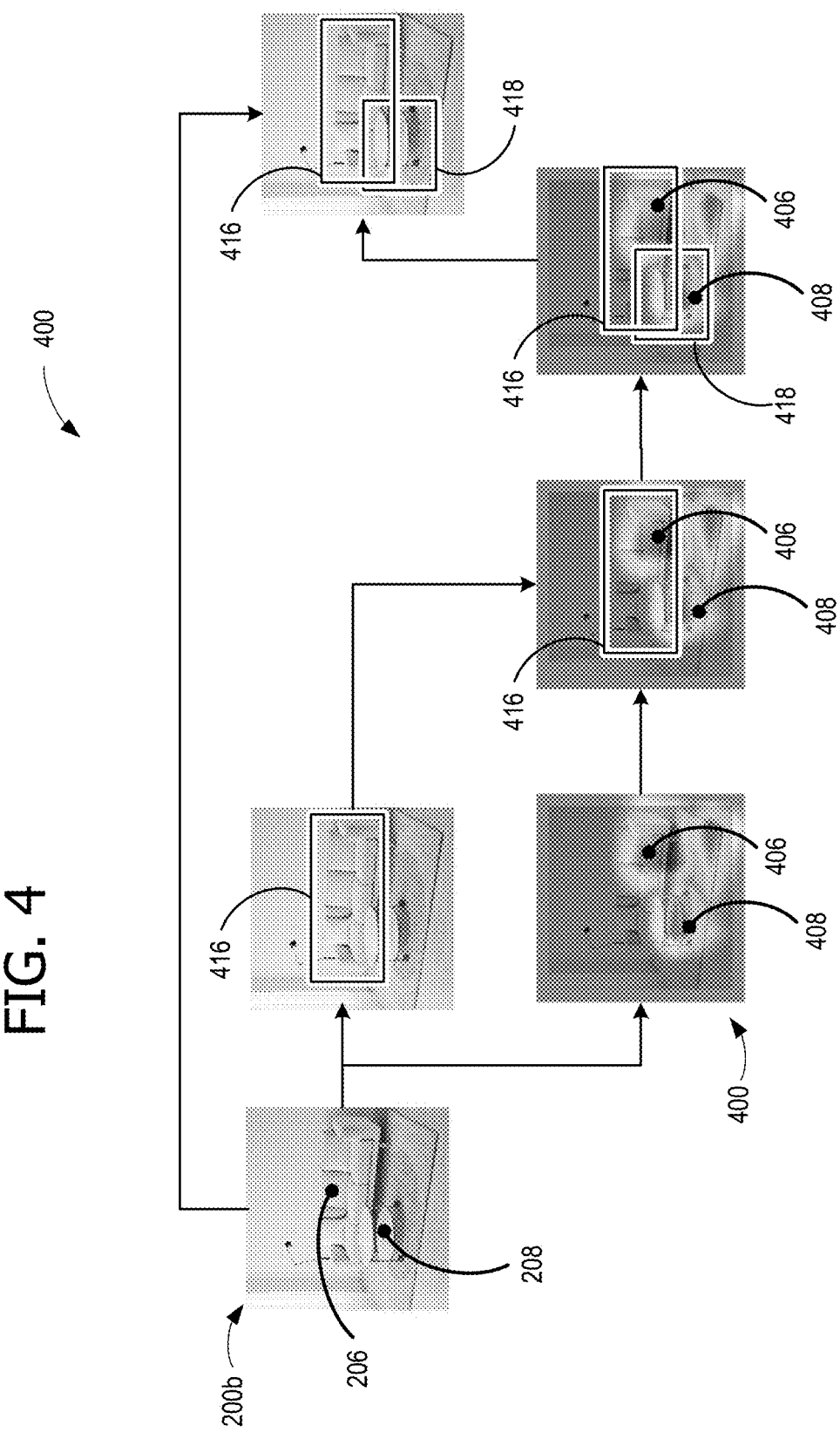
FIG. 4 illustrates the correction of a missed detection of a relevant object by the arrangement of FIG. 1.

A correlator 116 determines when a detected object, detected by object detector 112, corresponds with a region of interest in a heatmap output by heatmap generator 114. An object selector 118 identifies objects with a corresponding region of interest as relevant and objects without a corresponding region of interest as irrelevant, and also controls other logical operation of object localizer 110. For example, if a region of interest in a heatmap does not correspond with a detected object (e.g. a missed detection scenario), object selector 118 controls object localizer 110 to send at least that (possibly cropped) portion of the received multi-object image back to object detector 112 to detect the object responsible for the region of interest (e.g., flare region) in the heatmap. This missed detection remediation is illustrated in FIG. 4.

Object localizer 110 outputs output result 130, which contains a relevant object, but not an irrelevant object, from one of multi-object images 104a-104c (sourced from catalog 102). As illustrated, output result 130 indicates a first relevant detected object 134a and its object ID 136a, and a second relevant detected object 134b and its object ID 136b. object IDs 136a and 136b are object identifiers used in query 124. In some examples, output result 130 indicates a single relevant detected object. In some examples, output result 130 indicates additional relevant detected objects. In some examples, output result 130 indicates relevant objects as bounding boxes that had been generated by object detector 112 and selected as relevant by object selector 118. In such examples, relevant detected objects 134a and 134b are identified as the bounding boxes within the received multi-object image (e.g., multi-object image 104a) that, upon cropping, show the particular relevant object. In some examples, object IDs are not included in output result 130.

In some examples, localized object processing 140 intakes output result 130 and crops the multi-object image to bounding boxes around the relevant detected objects (e.g., as identified by relevant detected objects 134a and 134b). In some examples, localized object processing 140 uses a similar image selector 146 to select similar images from a library 142. As illustrated, library 142 holds an image 144a with its label 146a (for an object within image 144a), an image 144b with its label 146b, and an image 144c, with its label 146c. In some examples, similar image selector 146 identifies visually similar images by matching object ID 136a and/or object ID 136b with one or more of labels 146a-146c. It should be understood that, although library 142 is illustrated with three images and corresponding labels, library 142 may have thousands of images. The selected visually similar images are then provided to website 150 (e.g., an e-commerce website) for display to user on user display page 152. In some examples, localized object processing 140 provides the cropped images to a trainer 160 for inclusion in training data 162, thus enhancing the training of another ML model 168 (providing a further practical result).

Trainer 160 may be used to train ML model 120 using training data 162. As illustrated training data 162 holds labeled images: image 164a with its label 166a, image 164b with its label 166b, and image 164c with its label 166c. It should be understood that, although training data 162 is illustrated with three images and corresponding labels, training data 162 may have thousands of images. An example of generating training data is described in relation to FIGS. 11 and 12.

FIGS. 2A and 2B show practical applications for localizing relevant objects in multi-object images. In FIG. 2A, a received multi-object image 200a (which may be a version of multi-object image 104a) shows a table 202 (a detected object). A plurality of visually similar images 212, specifically a visually similar image 222a, a visually similar image 222b, a visually similar image 222c, and a visually similar image 222d, each contains an object (another table) that is visually similar to table 202. However, multi-object image 200a also shows a notebook computer 324 (see FIG. 3) and a couch. Both of these objects are irrelevant to the query.

Whereas FIG. 2A shows the detection of a single relevant object, FIG. 2B illustrates the detection of three relevant objects in a single multi-object image. A received multi-object image 200b (which may be a version of multi-object image 104b) shows a drape 204 (a detected object), a couch 206 (another detected object), and a table 208 (yet another detected object). A plurality of visually similar images is provided for each of drape 204, couch 206, and table 208. Specifically, for drape 204, a plurality of visually similar images 214 includes a visually similar image 224a, a visually similar image 224b, a visually similar image 224c, and a visually similar image 224d, each contains an object (another drape) that is visually similar. For couch 206, a plurality of visually similar images 216 includes a visually similar image 226a, a visually similar image 226b, a visually similar image 226c, and a visually similar image 226d, each contains an object (another couch) that is visually similar. For table 208, a plurality of visually similar images 218 includes a visually similar image 228a, a visually similar image 228b, a visually similar image 228c, and a visually similar image 228d, each contains an object (another table) that is visually similar. However, multi-object image 200b also shows an area rug that is irrelevant to the query.

FIG. 3 illustrates the suppression of an irrelevant object, specifically notebook computer 324 within multi-object image 200a, from output result 130. Object detector 112 detects table 202 and indicates it with a bounding box 312, and also detects notebook computer 324 and indicates it with a bounding box 314. Heatmap generator 114, cued to detect a table, generates a heatmap 300 with a region of interest 302. As can be seen in FIG. 3, bounding box 312 corresponds with region of interest 302, but bounding box 312 does not correspond with a region of interest. Thus, object selector 118 selects bounding box 312 to indicate as output result 130 (specifically as relevant detected object 134a). Notebook computer 324 is not indicated in output result 130.

FIG. 4 illustrates the correction of a missed detection of a relevant object. Object detector 112 initially detects couch 206 and indicates it with a bounding box 416, but misses table 208. Heatmap generator 114, cued to detect a table and a couch, generates a heatmap 400 with a region of interest 406 (for couch 206) and also a region of interest 408 (for table 208) from multi-object image 200b. As can be seen in FIG. 4, bounding box 416 corresponds with region of interest 406, but region of interest 408 does not correspond with a bounding box. Thus, at least the portion of multi-object image 200b around region of interest 408 is resubmitted to object detector 112. This this focused portion, object detector 112 now detects table 208 and indicates it with a bounding box 418. Object selector 118 selects bounding boxes 416 and 418 to indicate as output result 130 (specifically as relevant detected objects 134a and 134b).

Figure 5:
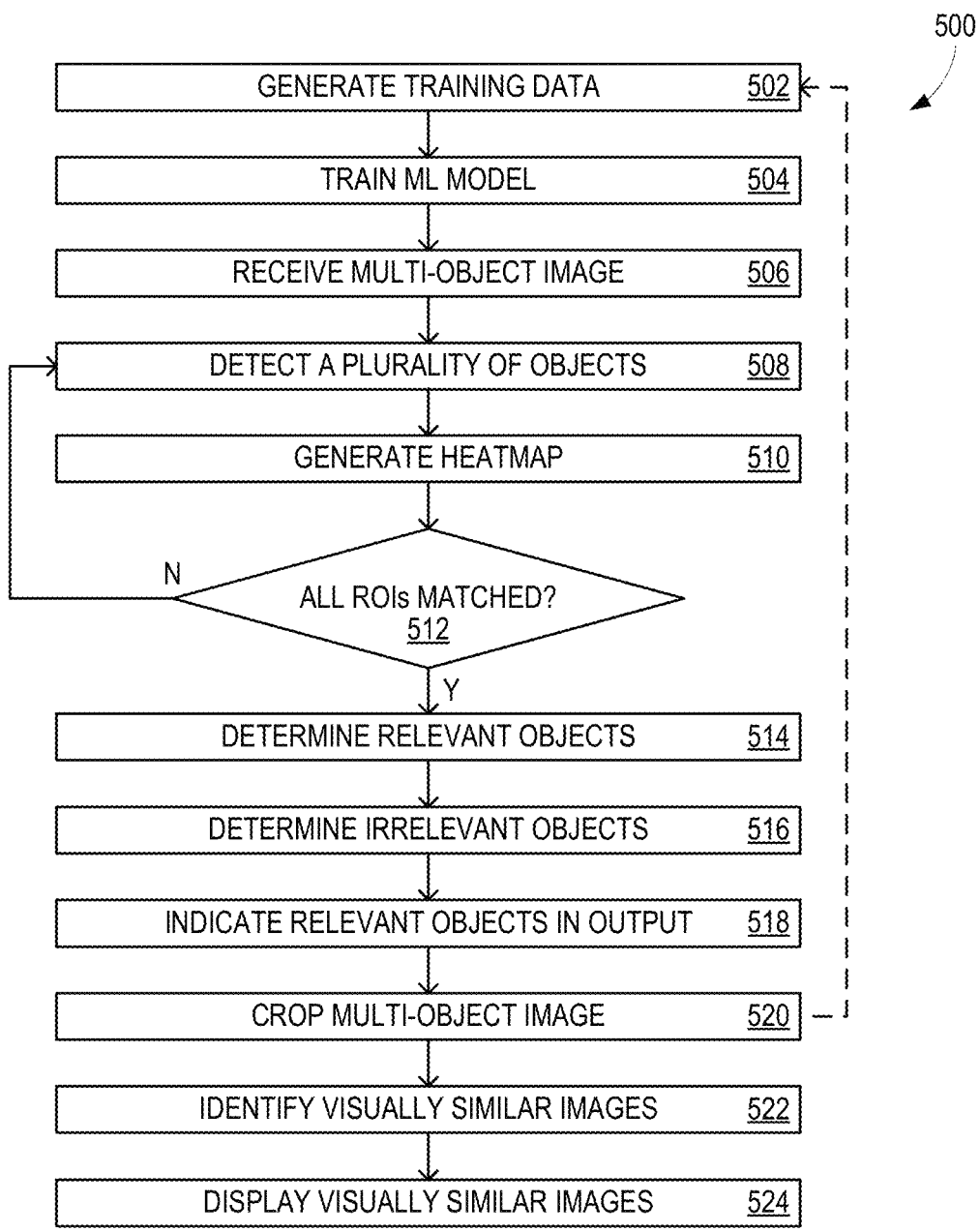
FIG. 5 is a flowchart illustrating exemplary operations that may performed by the arrangement of FIG. 1.

FIG. 5 is a flowchart 500 illustrating exemplary operations involved in localizing relevant objects in multi-object images with arrangement 100. In some examples, operations described for flowchart 500 are performed by computing device 1400 of FIG. 14. Flowchart 500 commences with operation 502, which includes generating training data 162. In some examples, operation 502 includes generating multi-object training data as a collage of images of multiple objects, as described in relation to FIGS. 11 and 12. In some examples, operation 502 generates training data for other ML models (e.g., other ML model 168), rather than only just for ML model 120. This may occur when objects detected and identified as relevant by object localizer 110 are sent to trainer 160 by localized object processing 140.

ML model 120 is trained by trainer 160, using training data 162, at 504. In some examples, operation 504 includes training a multi-object heatmap generator using training data labeled with tags for multiple objects (e.g., heatmap generator 114 is able to generate regions of interest for multiple different classes of objects at a time). In some examples, operation 504 includes training a single-object heatmap generator using training data labeled with tags for a single object type (e.g., heatmap generator 114 generates regions of interest for individual classes of objects and combines them into a final heatmap, as described in relation to FIGS. 9 and 10). Operation 506 includes receiving a multi-object image (e.g., multi-object image 104a). In some examples, the multi-object image comprises a query image (e.g., an image from which an object identified by query 124 is to be localized).

Operation 508 includes detecting a plurality of detected objects (e.g., table 208 or 208, drape 204, and/or couch 206) within the multi-object image. Detecting objects results in generating bounding boxes (e.g., bounding boxes 312, 314, 416, and 418) around the objects in the multi-object image. In some examples, in a first pass through operation 508, only a single object is detected, and it is the second (or later) pass that detects an additional object(s). Operation 510 includes generating a primary heatmap for the multi-object image, the primary heatmap having at least one region of interest (e.g., region of interest 302, 406, or 408). In some examples, generating the heatmap comprises generating GAMs. In some examples, operation 510 includes operations shown in flowchart 700 of FIG. 7, and illustrated in FIG. 6. In some examples, operation 510 includes operations shown in flowchart 900 of FIG. 9, and illustrated in FIG. 8.

Decision operation 512 determines whether all relevant regions of interest in the primary heatmap correspond to detected objects. If a region of interest is "orphaned" (e.g., no corresponding detected object), decision operation 512 includes identifying that a region of interest in the primary heatmap does not correspond to a detected object of the plurality of detected objects. In such a scenario, flowchart 500 returns to operation 508. Operation 508 then includes performing a second object detection process for a region of the multi-object image corresponding to the first region of interest in the primary heatmap, to detect the first relevant detected object. For example, as illustrated in FIG. 4, table 208 is not detected initially, but is detected after determining that region of interest 408 does not correspond to a detected object. In some examples, the multi-object image is cropped to a region corresponding to the first region of interest in the primary heatmap, in order to better focus object detector 112 and improve the likelihood of detecting an object in the focused portion of the multi-object image. When operation 508 is repeated, in some examples, operation 510 is skipped after the second (or later) iteration of operation 508.

Operation 514 includes determining a first relevant detected object corresponding to a region of interest in the primary heatmap (e.g., table 202 corresponds to region of interest 302 in heatmap 300 of FIG. 3). In some examples, operation 514 also includes determining a second relevant detected object corresponding to a second region of interest of the primary heatmap (e.g., when multiple objects of a single object class, or multiple objects are to be localized in the multi-object image). Operation 516 includes determining an irrelevant detected object not corresponding to a region of interest in the primary heatmap (e.g., notebook computer 324 does not correspond to a region of interest in heatmap 300). In some examples, operations 514 and 516 are performed simultaneously, as a scoring and ranking operation, as described in relation to flowchart 1000 of FIG. 10.

Operation 518 includes indicating the first relevant detected object as an output result (e.g., as relevant detected object 134a, possibly with object ID 136a, in output result 130), but not indicating the irrelevant detected object as an output result. In some examples, operation 518 further includes indicating the second relevant detected object as a second output result (e.g., as relevant detected object 134b, possibly with object ID 136b, in output result 130). Operation 520 includes cropping the multi-object image to a bounding box around the first relevant detected object. In some examples, operation 520 further includes cropping the multi-object image to a bounding box around the second relevant detected object. In some examples, cropped images around relevant objects are provided, along with their object IDs (for labeling) as training data for other ML models, going back to operation 502.

Operation 522 includes identifying a plurality of visually similar images containing objects that are visually similar to the first relevant detected object. In some examples, the identification of visually similar objects leverages object IDs. In such examples, identifying a plurality of visually similar images containing objects that are visually similar to the first relevant detected object comprises determining an object identification of the first relevant detected object; and searching for objects having a corresponding object identification (e.g., label 146a) corresponding to the object identification (e.g., object ID 136a) of the first relevant detected object, wherein the objects that are visually similar to the first relevant detected object have the corresponding object identification. In some examples, operation 522 further includes identifying a second plurality of visually similar images containing objects that are visually similar to the second relevant detected object. Operation 524 includes displaying the plurality of visually similar images to a user (e.g., on website 150). In some examples, operation 524 further includes displaying the second plurality of visually similar images to the user.

Figure 6:
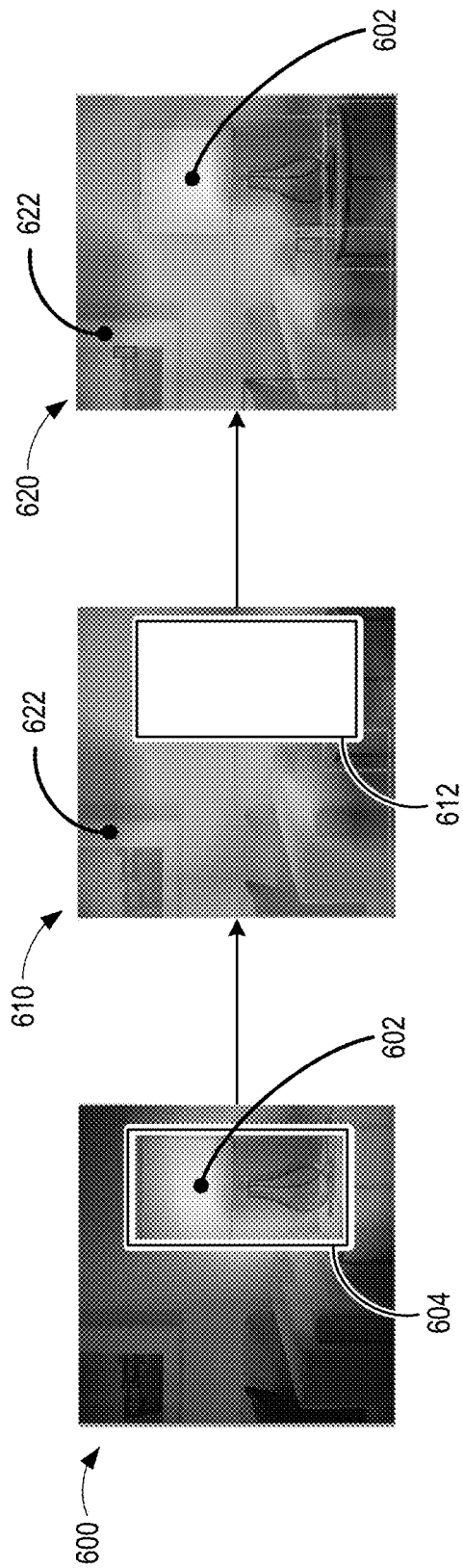
FIG. 6 illustrates the improvement of heatmaps, as may be used with some examples of the arrangement of FIG. 1
Figure 7:
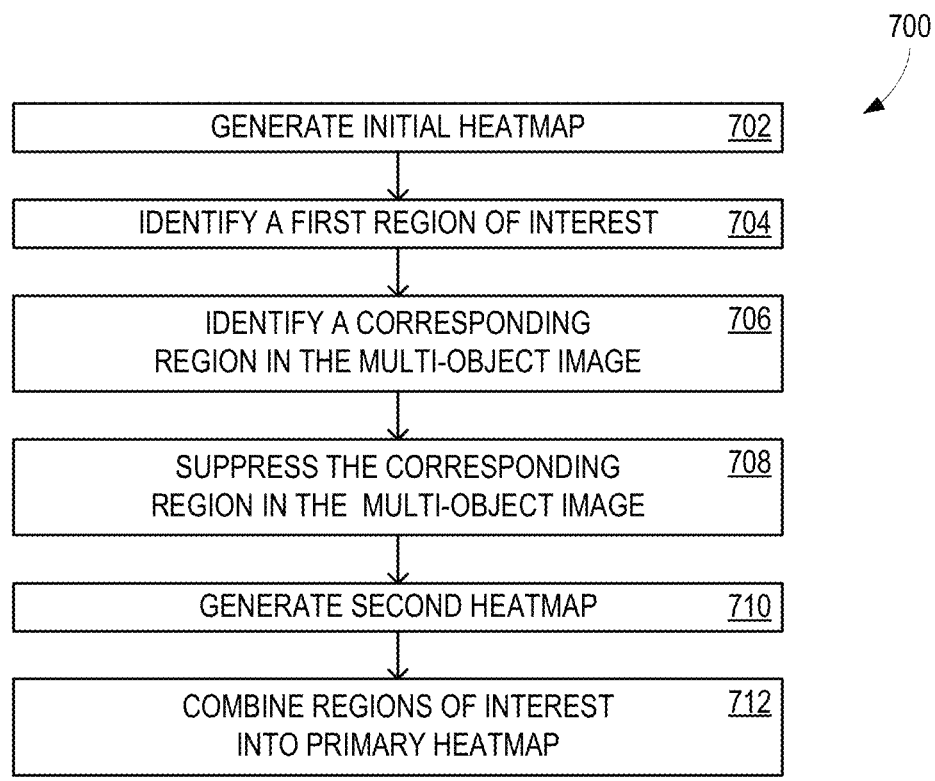
FIG. 7 is a flowchart illustrating exemplary operations associated with the heatmap improvement illustrated in FIG. 6.

FIG. 6 illustrates the improvement of heatmaps, as may be used with some examples of operation 510 of flowchart 500. FIG. 7 is a flowchart 700 (substituting for or supplementing operation 510) illustrating exemplary operations involved in heatmap improvement illustrated in FIG. 6. In some examples, operations described for flowchart 700 are performed by computing device 1400 of FIG. 14. Flowchart 700 commences with operation 702, which includes generating an initial heatmap 600 for a multi-object image. A first region of interest 602 is identified at 704. Operation 706 includes identifying a corresponding region of interest in the multi-object image, for example using a bounding box 604 around region of interest 602. Operation 708 includes suppressing, in the multi-object image, a suppressed region 612 corresponding to region of interest 602 in initial heatmap 600.

Operation 710 includes generating a second heatmap 610 for the multi-object image with suppressed region 612. Operation 712 includes combining (e.g., superimposing) region of interest 602 of initial heatmap 600 with second heatmap 610. Operation 712 produces primary heatmap 620 that is output from operation 510 (and flowchart 700).

Figure 8:
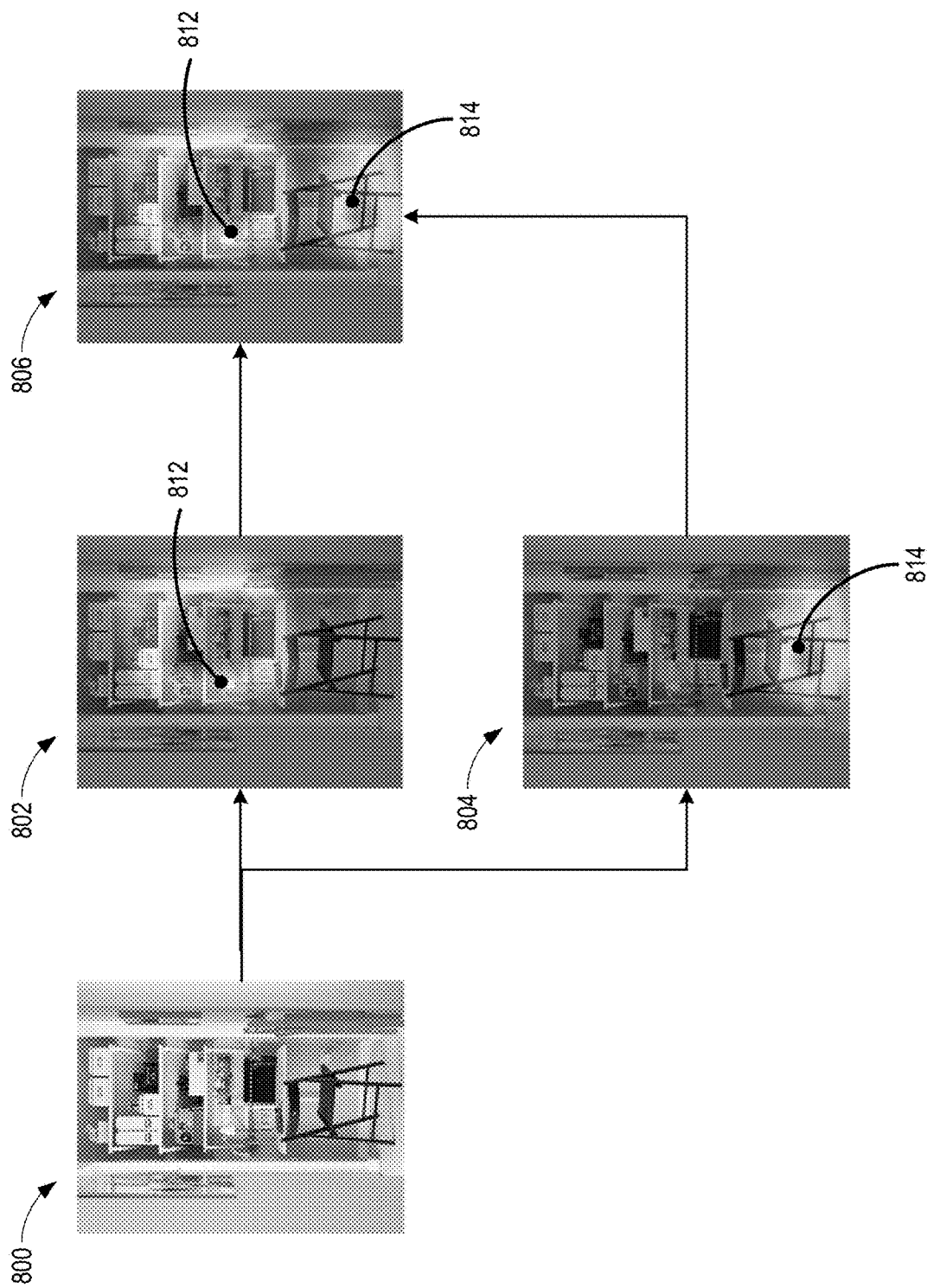
FIG. 8 illustrates the combination of heatmap hotspots (regions of interest), as performed by some examples of the arrangement of FIG. 1.
Figure 9:
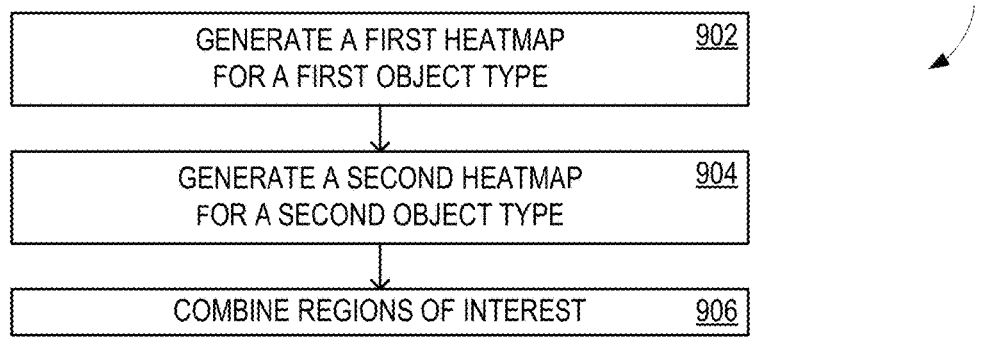
FIG. 9 is a flowchart illustrating exemplary operations associated with the heatmap hotspot combination illustrated in FIG. 8.

FIG. 8 illustrates the combination of heatmap hotspots (regions of interest), as may be used with some examples of operation 510 of flowchart 500. FIG. 9 is a flowchart 900 (substituting for or supplementing operation 510) illustrating exemplary operations involved in heatmap combination illustrated in FIG. 9. In some examples, flowcharts 700 and 900 may be used together. In some examples, operations described for flowchart 900 are performed by computing device 1400 of FIG. 14.

Flowchart 900 commences with operation 902, which includes generating a first heatmap 802 for a multi-object image 800 (which may be an example of multi-object image 104a) for a first object type. First heatmap 802 has a first region of interest 812. Operation 904 includes generating a second heatmap 804 for multi-object image 800 for a second object type. Second heatmap 804 has a first region of interest

814. Operation 906 includes combining (e.g., superimposing) region of interest 812 of first heatmap 802 with region of interest 814 of second heatmap 804. This produces a primary (final) heatmap 806 that contains both region of interest 812 and region of interest 814.

Flowchart 900 is similar to flowchart 700 in that both involve combining regions of interest form separately generated heatmaps. Flowchart 700 is used when the flare region of the initial heatmap obscures other possible regions of interest, and so the suppressed region permits detection of the other regions of interest. Flowchart 700 may be used when heatmap generator 114 is capable of detecting regions of interest for multiple classes of objects simultaneously. Flowchart 900 is used when heatmap generator 114 detects regions of interest for one class of objects at a time. However, the suppressed region of flowchart 700 may also be used with the operations of flowchart 900.

Figure 10:
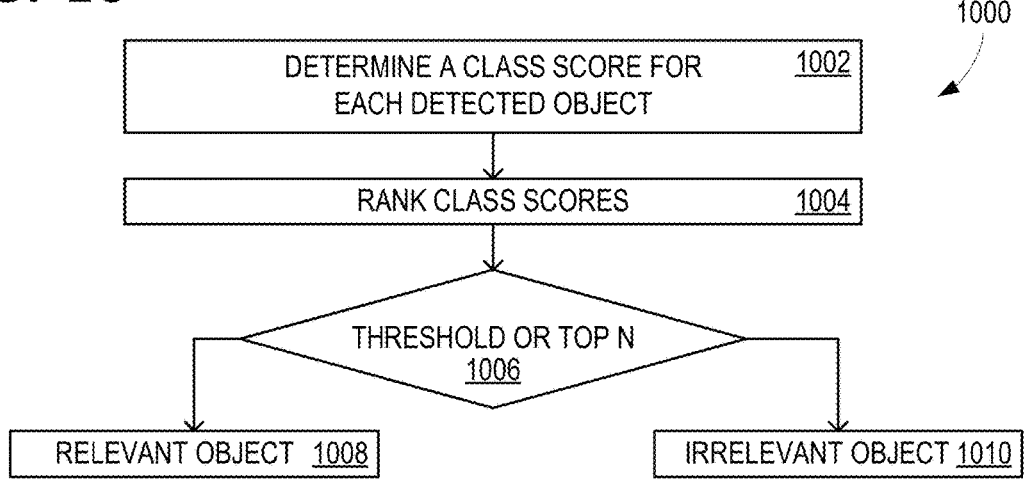
FIG. 10 is a flowchart illustrating exemplary operations associated with scoring detected objects, as performed by some examples of the arrangement of FIG. 1.

FIG. 10 is a flowchart 1000 illustrating exemplary operations involved in scoring detected objects, for example producing one or values of object class score 122. In some examples, operations described for flowchart 1000 are performed by computing device 1400 of FIG. 14. In some examples, flowchart 1000 substitutes for operations 514 and 516 of flowchart 500. Flowchart 1000 commences with operation 1002, which includes determining a class score (e.g., object class score 122) for each detected object. This includes determining class scores for each object that will later be determined to be relevant or irrelevant (e.g., determining a class score for each of the first relevant detected object and the irrelevant detected object). In some examples, object class score 122 is calculated using the union of a bounding box and heatmap pixels within the bounding box having sufficiently high values (e.g., above a threshold).

Operation 1004 includes ranking the class scores, wherein the class score for the first relevant detected object exceeds the class score for the irrelevant detected object. Decision operation 1006 either selects scores above a threshold or the top N scores (e.g., the top score or top 2 or 3 scores), and identifies the corresponding object as a relevant object 1008 or an irrelevant object 1010.

Figure 11:
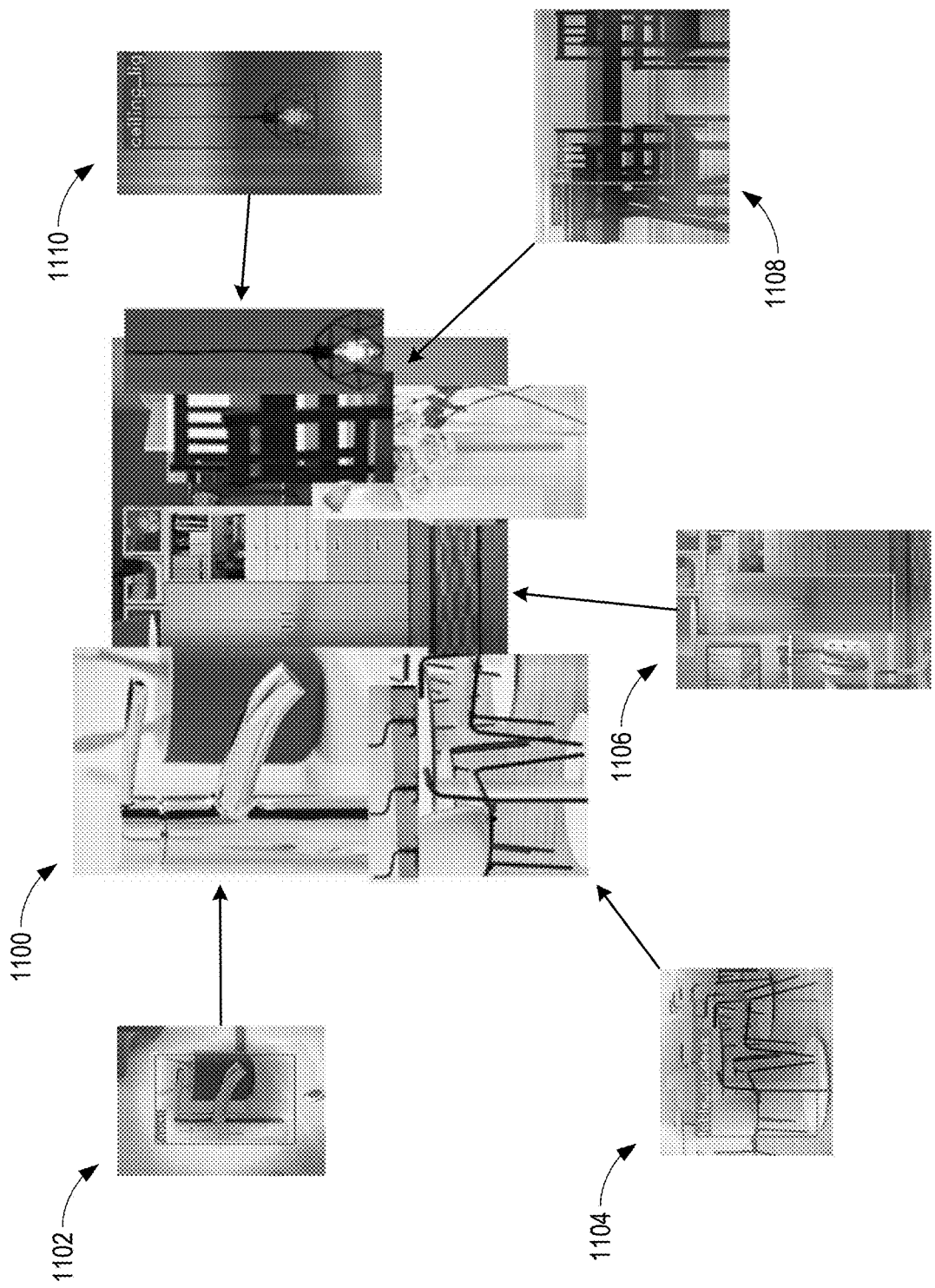
FIG. 11 illustrates the generation of training data that may be used by some examples of the arrangement of FIG. 1.
Figure 12:
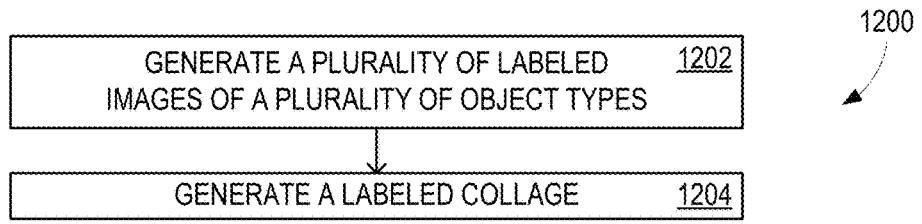
FIG. 12 is a flowchart illustrating exemplary operations associated with the generation of training data illustrated in FIG. 11.

FIG. 11 illustrates the generation of training data 162 that may be used by some examples of operation 502 of flowchart 500. FIG. 12 is a flowchart 1200 (substituting for or supplementing operation 502) illustrating exemplary operations involved in the generation of training data illustrated in FIG. 11. Specifically, flowchart 1200 describes generating multi-object training data as a collage of images of multiple objects. In some examples, operations described for flowchart 1200 are performed by computing device 1400 of FIG. 14. Flowchart 1200 commences with operation 1202, which includes generating a plurality of labeled images of a plurality of object types. For example, FIG. 11 shows the plurality of labeled images as a labeled image 1102, a labeled image 1104, a labeled image 1106, a labeled image 1108, and a labeled image 1110. Operation 1204 includes generating a labeled collage 1100 of the plurality of labeled images of the plurality of object types. Flowchart 1200 may be used when ML model 120 is to be trained to recognize multiple object types in a multi-object image using labeled collage 1100.

Figure 13:
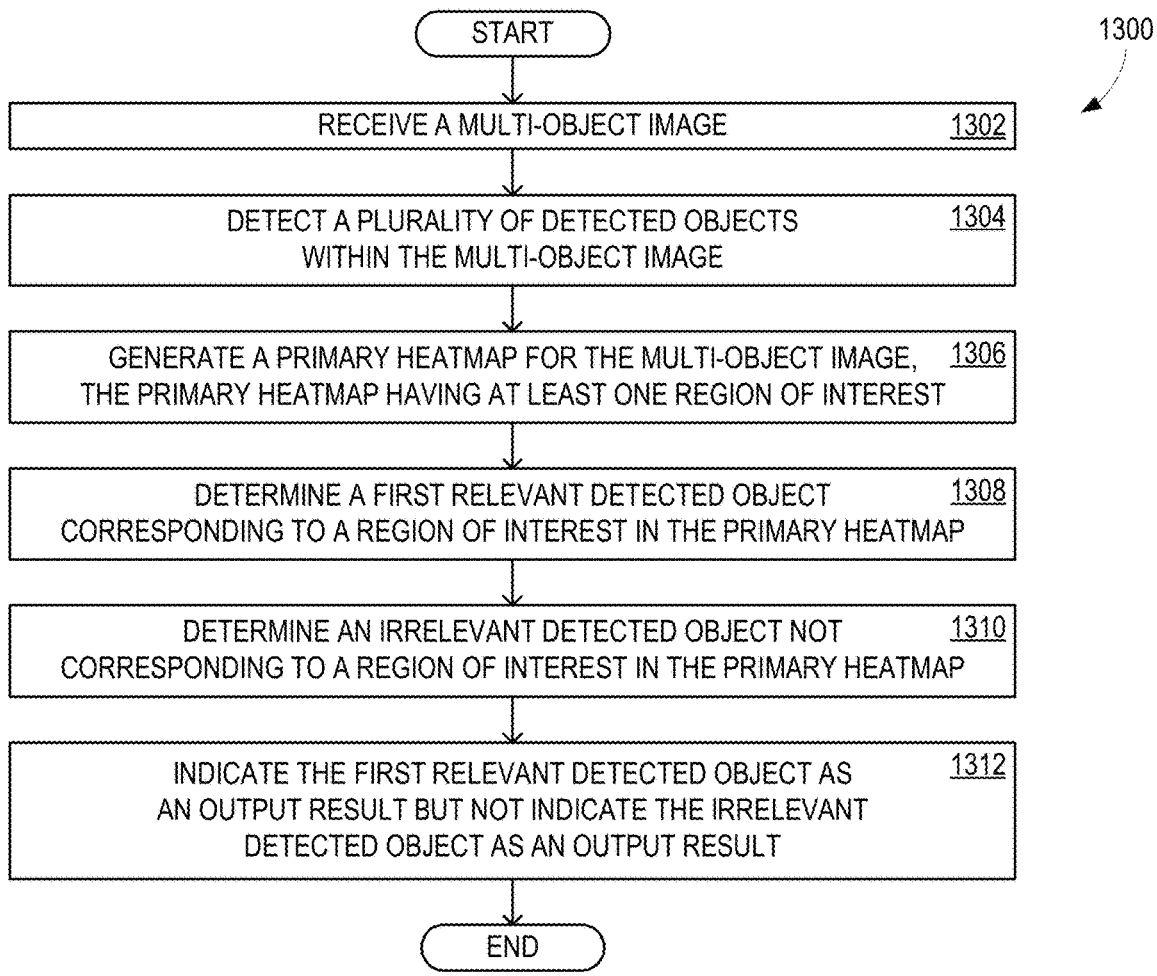
FIG. 13 is another flowchart illustrating exemplary operations performed using the arrangement of FIG. 1.

FIG. 13 is a flowchart 1300 illustrating exemplary operations involved in localizing relevant objects in multi-object images. In some examples, operations described for flowchart 1300 are performed by computing device 1400 of FIG. 14. Flowchart 1300 commences with operation 1302, which includes receiving a multi-object image. Operation 1304 includes detecting a plurality of detected objects within the multi-object image. Operation 1306 includes generating a primary heatmap for the multi-object image, the primary heatmap having at least one region of interest. Operation 1308 includes determining a first relevant detected object corresponding to a region of interest in the primary heatmap. Operation 1310 includes determining an irrelevant detected object not corresponding to a region of interest in the primary heatmap. Operation 1312 includes indicating the first relevant detected object as an output result but not indicating the irrelevant detected object as an output result.

Additional Examples

An example method of localizing relevant objects in multi-object images comprises: receiving a multi-object image; detecting a plurality of detected objects within the multi-object image; generating a primary heatmap for the multi-object image, the primary heatmap having at least one region of interest; determining a first relevant detected object corresponding to a region of interest in the primary heatmap; determining an irrelevant detected object not corresponding to a region of interest in the primary heatmap; and indicating the first relevant detected object as an output result but not indicating the irrelevant detected object as an output result.

An example system for localizing relevant objects in multi-object images comprises: a processor; and a computer-readable medium storing instructions that are operative upon execution by the processor to: receive a multi-object image; detect a plurality of detected objects within the multi-object image; generate a primary heatmap for the multi-object image, the primary heatmap having at least one region of interest; determine a first relevant detected object corresponding to a region of interest in the primary heatmap; determine an irrelevant detected object not corresponding to a region of interest in the primary heatmap; and indicate the first relevant detected object as an output result but not indicate the irrelevant detected object as an output result.

One or more example computer storage devices has computer-executable instructions stored thereon, which, on execution by a computer, cause the computer to perform operations comprising: receiving a multi-object image; detecting a plurality of detected objects within the multi-object image; generating a primary heatmap for the multi-object image, the primary heatmap having at least one region of interest; determining a first relevant detected object corresponding to a region of interest in the primary heatmap; determining an irrelevant detected object not corresponding to a region of interest in the primary heatmap; and indicating the first relevant detected object as an output result but not indicating the irrelevant detected object as an output result.

Alternatively, or in addition to the other examples described herein, examples include any combination of the following:

identifying that a first region of interest in the primary heatmap does not correspond to a detected object of the plurality of detected objects;

performing a second object detection process for a region of the multi-object image corresponding to the first region of interest in the primary heatmap, to detect the first relevant detected object;

cropping the multi-object image to a bounding box around the first relevant detected object;

identifying a plurality of visually similar images containing objects that are visually similar to the first relevant detected object;

displaying the plurality of visually similar images to a user;
determining a second relevant detected object corresponding to a second region of interest of the primary heatmap;
indicating the second relevant detected object as a second output result;
determining a first relevant detected object corresponding to a region of interest in the primary heatmap and determining an irrelevant detected object not corresponding to a region of interest in the primary heatmap comprises: determining a class score for each of the first relevant detected object and the irrelevant detected object; and ranking the class scores, wherein the class score for the first relevant detected object exceeds the class score for the irrelevant detected object;
the class score is calculated using a union of a bounding box and heatmap pixels within the bounding box having sufficiently high values;
generating the primary heatmap comprises: generating a first heatmap for the multi-object image for a first object type; generating a second heatmap for the multi-object image for a second object type; and combining a region of interest of the first heatmap with a region of interest of the second heatmap;
the multi-object image comprises a query image;
identifying a plurality of visually similar images containing objects that are visually similar to the first relevant detected object comprises determining an object identification of the first relevant detected object; and searching for objects having a corresponding object identification corresponding to the object identification of the first relevant detected object, wherein the objects that are visually similar to the first relevant detected object have the corresponding object identification;
cropping the multi-object image to a bounding box around the second relevant detected object;
identifying a second plurality of visually similar images containing objects that are visually similar to the second relevant detected object;
displaying the second plurality of visually similar images to the user;
generating the primary heatmap comprises: generating an initial heatmap for the multi-object image; suppressing, in the multi-object image, a suppressed region corresponding to the region of interest in the initial heatmap; generating a second heatmap for the multi-object image with the suppressed region; and combining the region of interest of the initial heatmap with the second heatmap;
generating the heatmap comprises generating a GAM;
generating multi-object training data as a collage of images of multiple objects;
training a multi-object heatmap generator using training data labeled with tags for multiple objects;
generating a plurality of labeled images of a plurality of object types;
generating a labeled collage of the plurality of labeled images of the plurality of object types; and
training an ML model to recognize multiple object types in a multi-object image using the labeled collage.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
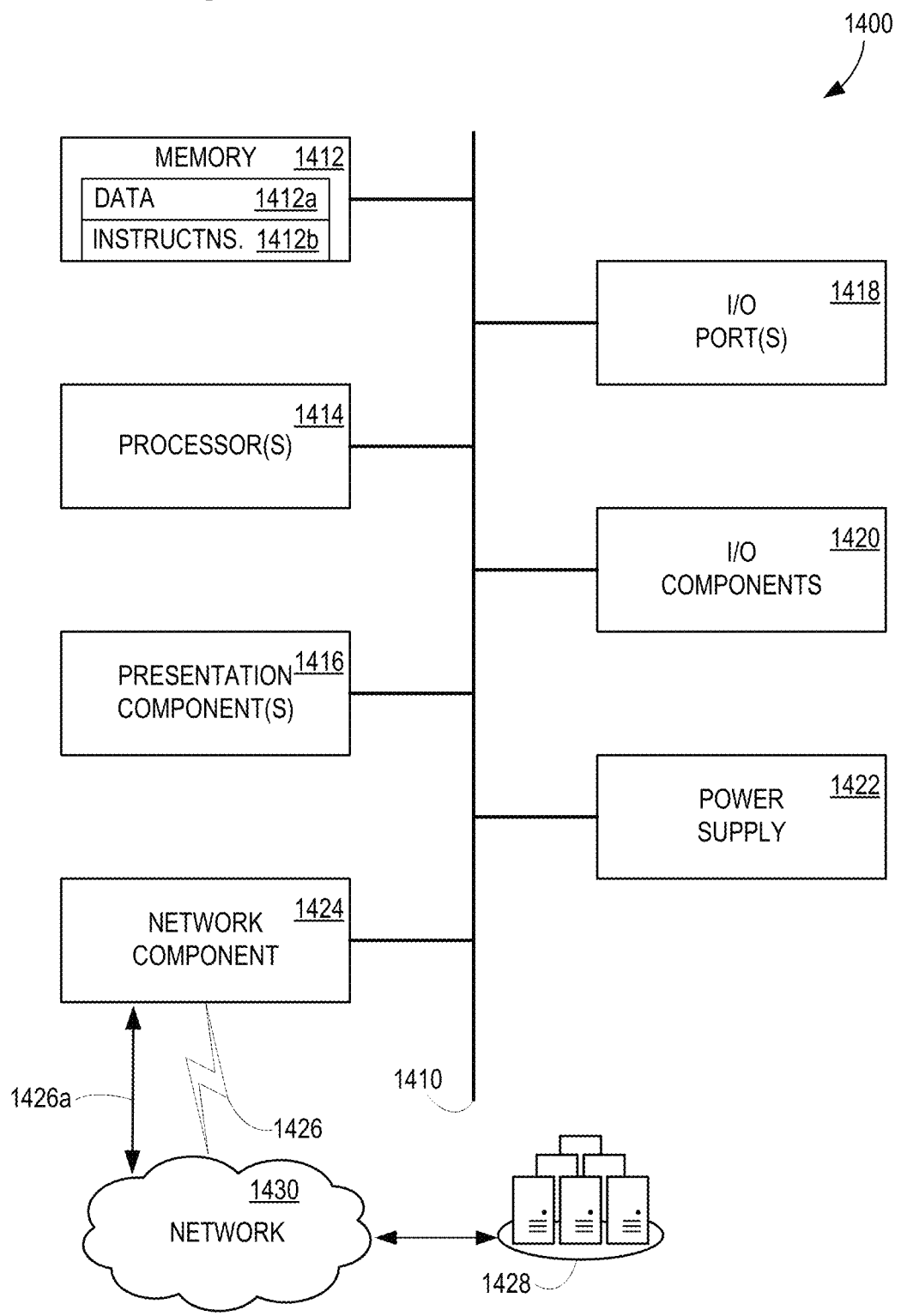
FIG. 14 is a block diagram of an example computing environment suitable for implementing some of the various examples disclosed herein.

FIG. 14 is a block diagram of an example computing device 1400 for implementing aspects disclosed herein, and is designated generally as computing device 1400. Computing device 1400 is but one example of a suitable computing environment and is not intended to suggest any limitation as to the scope of use or functionality of the examples disclosed herein. Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer-storage memory 1412, one or more processors 1414, one or more presentation components 1416, I/O ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device." Memory 1412 may take the form of the computer-storage media references below and operatively provide storage of computer-readable instructions, data structures, program modules and other data for the computing device 1400. In some examples, memory 1412 stores one or more of an operating system, a universal application platform, or other program modules and program data. Memory 1412 is thus able to store and access data 1412a and instructions 1412b that are executable by processor 1414 and configured to carry out the various operations disclosed herein.

In some examples, memory 1412 includes computer-storage media in the form of volatile and/or nonvolatile memory, removable or non-removable memory, data disks in virtual environments, or a combination thereof. Memory 1412 may include any quantity of memory associated with or accessible by the computing device 1400. Memory 1412 may be internal to the computing device 1400 (as shown in FIG. 14), external to the computing device 1400 (not shown), or both (not shown). Examples of memory 1412 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1400. Additionally, or alternatively, the memory 1412 may be distributed across multiple computing devices 1400, for example, in a virtualized environment in which instruction processing is carried out on multiple devices 1400. For the purposes of this disclosure, "computer storage media," "computer-storage memory," "memory," and "memory devices" are synonymous terms for the computer-storage memory 1412, and none of these terms include carrier waves or propagating signaling.

Processor(s) 1414 may include any quantity of processing units that read data from various entities, such as memory 1412 or I/O components 1420. Specifically, processor(s) 1414 are programmed to execute computer-executable instructions for implementing aspects of the disclosure. The instructions may be performed by the processor, by multiple processors within the computing device 1400, or by a processor external to the client computing device 1400. In some examples, the processor(s) 1414 are programmed to execute instructions such as those illustrated in the flow charts discussed below and depicted in the accompanying drawings. Moreover, in some examples, the processor(s) 1414 represent an implementation of analog techniques to perform the operations described herein. For example, the operations may be performed by an analog client computing device 1400 and/or a digital client computing device 1400. Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

The computing device 1400 may operate in a networked environment via the network component 1424 using logical connections to one or more remote computers. In some examples, the network component 1424 includes a network interface card and/or computer-executable instructions (e.g., a driver) for operating the network interface card. Communication between the computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426 and/or a wired communication link 1426a to a cloud resource 1428 across network 1430. Various different examples of communication links 1426 and 1426a include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of localizing relevant objects in multi-object images, the method comprising:
   receiving a multi-object image;
   detecting a plurality of detected objects within the multi-object image;
   generating a primary heatmap for the multi-object image, the primary heatmap having at least one region of interest;
   determining a first relevant detected object corresponding to a region of interest in the primary heatmap;
   determining an irrelevant detected object not corresponding to a region of interest in the primary heatmap;
   determining a class score for each of the first relevant detected object and the irrelevant detected object;
   ranking the class scores, wherein the class score for the first relevant detected object exceeds the class score for the irrelevant detected object; and
   indicating the first relevant detected object as an output result but not indicating the irrelevant detected object as an output result.

2. The method of claim 1, further comprising:
   identifying that a first region of interest in the primary heatmap does not correspond to a detected object of the plurality of detected objects; and
   performing a second object detection process for a region of the multi-object image corresponding to the first region of interest in the primary heatmap, to detect the first relevant detected object.

3. The method of claim 1, further comprising:
   cropping the multi-object image to a bounding box around the first relevant detected object.

4. The method of claim 1, further comprising:
   identifying a plurality of visually similar images containing objects that are visually similar to the first relevant detected object; and
   displaying the plurality of visually similar images to a user.

5. The method of claim 1, further comprising:
   determining a second relevant detected object corresponding to a second region of interest of the primary heatmap; and
   indicating the second relevant detected object as a second output result.

6. The method of claim 1, wherein the primary heatmap is generated using a gradient activation map (GAM) process.

7. The method of claim 1, wherein generating the primary heatmap comprises:
   generating a first heatmap for the multi-object image for a first object type;
   generating a second heatmap for the multi-object image for a second object type; and
   combining a region of interest of the first heatmap with a region of interest of the second heatmap.

8. A system for localizing relevant objects in multi-object images, the system comprising:
   a processor; and
   a computer-readable medium storing instructions that are operative upon execution by the processor to:
   receive a multi-object image;
   detect a plurality of detected objects within the multi-object image;
   generate a primary heatmap for the multi-object image, the primary heatmap having at least one region of interest;
   determine a first relevant detected object corresponding to a region of interest in the primary heatmap;
   determine an irrelevant detected object not corresponding to a region of interest in the primary heatmap;
   determine a class score for each of the first relevant detected object and the irrelevant detected object;
   rank the class scores, wherein the class score for the first relevant detected object exceeds the class score for the irrelevant detected object; and
   indicate the first relevant detected object as an output result but not indicate the irrelevant detected object as an output result.

9. The system of claim 8, wherein the instructions are further operative to:
   identify that a first region of interest in the primary heatmap does not correspond to a detected object of the plurality of detected objects; and
   perform a second object detection process for a region of the multi-object image corresponding to the first region of interest in the primary heatmap, to detect the first relevant detected object.

10. The system of claim 8, wherein the instructions are further operative to:
    crop the multi-object image to a bounding box around the first relevant detected object.

11. The system of claim 8, wherein the instructions are further operative to:
    identify a plurality of visually similar images containing objects that are visually similar to the first relevant detected object; and
    displaying the plurality of visually similar images to a user.

12. The system of claim 8, wherein the instructions are further operative to:
- determine a second relevant detected object corresponding to a second region of interest of the primary heatmap; and
- indicate the second relevant detected object as a second output result.

13. The system of claim 8, wherein the primary heatmap is generated using a gradient activation map (GAM) process.

14. The system of claim 8, wherein generating the primary heatmap comprises:
- generating a first heatmap for the multi-object image for a first object type;
- generating a second heatmap for the multi-object image for a second object type; and
- combining a region of interest of the first heatmap with a region of interest of the second heatmap.

15. One or more computer storage devices having computer-executable instructions stored thereon, which, on execution by a computer, cause the computer to perform operations comprising:
- receiving a multi-object image;
- detecting a plurality of detected objects within the multi-object image;
- generating a primary heatmap for the multi-object image, the primary heatmap having at least one region of interest;
- determining a first relevant detected object corresponding to a region of interest in the primary heatmap;
- determining an irrelevant detected object not corresponding to a region of interest in the primary heatmap;
- determining a class score for each of the first relevant detected object and the irrelevant detected object;
- ranking the class scores, wherein the class score for the first relevant detected object exceeds the class score for the irrelevant detected object; and
- indicating the first relevant detected object as an output result but not indicating the irrelevant detected object as an output result.

16. The one or more computer storage devices of claim 15, wherein the operations further comprise
- identifying that a first region of interest in the primary heatmap does not correspond to a detected object of the plurality of detected objects; and
- performing a second object detection process for a region of the multi-object image corresponding to the first region of interest in the primary heatmap, to detect the first relevant detected object.

17. The one or more computer storage devices of claim 15, wherein the operations further comprise
- cropping the multi-object image to a bounding box around the first relevant detected object.

18. The one or more computer storage devices of claim 15, wherein the operations further comprise
- identifying a plurality of visually similar images containing objects that are visually similar to the first relevant detected object; and
- displaying the plurality of visually similar images to a user.

19. The one or more computer storage devices of claim 15, wherein the operations further comprise
- determining a second relevant detected object corresponding to a second region of interest of the primary heatmap; and
- indicating the second relevant detected object as a second output result.

20. The one or more computer storage devices of claim 15, wherein the primary heatmap is generated using a gradient activation map (GAM) process.

* * * * *